Oct. 31, 1933.  R. A. ALTENHOF  1,932,502
CONSTRUCTION MATERIAL
Filed Jan. 25, 1930

INVENTOR.
Ralph A. Altenhof.
BY Jesse R. Langley
ATTORNEY.

Patented Oct. 31, 1933

1,932,502

UNITED STATES PATENT OFFICE 1,932,502

CONSTRUCTION MATERIAL

Ralph A. Altenhof, Bethel Township, Allegheny County, Pa., assignor to The Koppers Company of Delaware, a corporation of Delaware Application January 25, 1930. Serial No. 423,406

2 Claims. (Cl. 91—68)

This invention relates to construction materials and more particularly to waterproof, stone or stone-like materials and to processes of preparing the same.

Considerable difficulty is experienced in preventing moisture or water from passing through stone or similar materials used for construction purposes. In the construction of buildings, where certain portions of the walls are necessarily thin, moisture often finds its way through the pores in the stone. In cellars as well as in tunnels there is danger of seepage which causes erosion and produces unsightly stains. To overcome these difficulties, certain waterproofing agents have been employed, but satisfactory results have not always been obtained.

The present invention provides a means whereby such materials as stone, concrete, cement, brick, and other porous ceramic materials, are rendered impervious to water or moisture or even to air. This is accomplished by sealing the surface of the material with a relatively thin film of metal. To produce this film, finely divided metal, such as alminum, aluminum bronze or copper bronze, preferably in flake form, is suspended in a liquid medium containing bituminous matter. This mixture is applied to the stone or stone-like materials by spraying or by brushing. Blocks of the latter materials may also be dipped in the mixture.

When the above mixture is applied to the surface of concrete or brick or other material of like nature, the metal, particularly when it is in flaked form, immediately forms a continuous film on the surface of the concrete or other material. This film of metal prevents any substantial evaporation of the liquid medium and causes the latter to take the other course, namely, to penetrate or impregnate the concrete or other material. A practically perfect seal is thereby formed.

Figure 1:
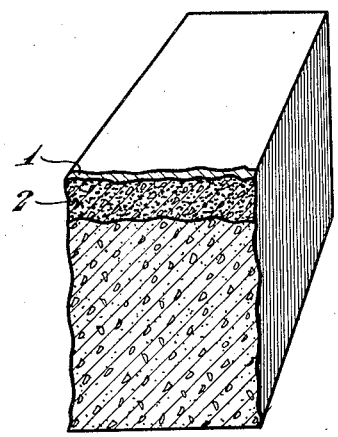

In the accompanying drawing, Figure 1 shows a section through a concrete block, one surface of which is coated with the waterproofing material. The outer layer 1, which is somewhat exaggerated in thickness, represents the metallic film. The inner layer 2 represents the portion of the block impregnated or saturated with the bitumen.

Figure 2:
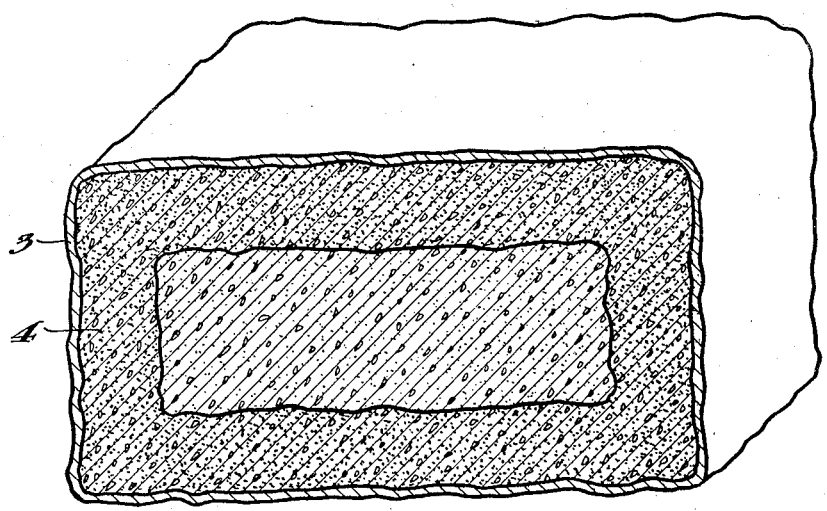

Fig. 2, which shows a section through a block of stone-like material, illustrates the relative positions of the metallic film 3 and the bitumen-saturated-layer 4 after the waterproofing material has been applied to the entire surface of the block.

The preferred bituminous material is a sulphur treated tar such as that described in a copending application Serial No. 434,811, filed Mar. 10, 1930. Sulphur treated water gas tar, oil gas tar or coke oven tar have excellent penetrating qualities and are extremely resistant to the effects of water.

The tar to be treated is first dehydrated and then heated with about 5% or more by weight of powdered sulphur. The heating is continued so long as substantial amounts of hydrogen sulphide are evolved. The treated tar is then ready to be mixed with the metallic powder in the proportion of about two pounds per gallon of tar.

As stated in the above application, other materials such as resins, gums, bituments such as gilsonite, and materials usually added to paints may be added to the tar.

Porous stone material after treatment with the above waterproofing agent has on its outer surface a continuous film of metal formed by overlapping flakes which cover the pores. The bituminous matter fills the pores for a substantial distance inwardly. Enough of the bitumen remains at the surface to hold the metal flakes in position. Sulphur treated tars are particularly suitable in this case in that they have excellent adhesive properties and only a small amount is necessary to cause the metallic flakes to adhere firmly to the stone. Furthermore, these tars will not bleed through the metal film.

Sulphur treated tars are comparatively free from solid particles and permit rapid leafing and the formation of a perfectly continuous film of the metal flakes on stone materials. The flakes are not affected by the sulphur treated tars due to the fact that these tars are practically free from acid.

While I have described sulphur treated tar as the preferred waterproofing material and vehicle for the metal powder, it is conceivable that certain other forms of tar and asphalt may be employed without materially impairing the characteristics of the process or the product of my invention.

When untreated tars and asphalts are employed, the relative positions of the layers illustrated in the drawing are substantially the same but the advantages of sulphur treated tars are more or less lacking.

It is readily seen that stone-like materials combined with an outer film of metal and impregnated with bituminous material have a number of advantages and are adapted to many uses. Besides being waterproof they are less affected by oils. When applied to walls of tunnels or of cellars, a practically water-tight seal is obtained, and at the same time where aluminum is used a particularly pleasing, bright surface is obtained which is not subject to stain and that serves to reflect light. Grave vaults, which are usually made of concrete, may also be rendered waterproof or more pleasing in appearance by means of the foregoing materials. They may also be used on dams and in the bottoms of pools.

I claim as my invention:

1. Construction material comprising porous stone or stone-like material having in its pores sulphur-treated tar and having on its surface a continuous film of metal.

2. Construction material comprising porous stone or stone-like material having in its pores sulphur-treated water-gas tar and having on its surface a continuous film of metal.

RALPH A. ALTENHOF.